(12) United States Patent
Katukam et al.

(10) Patent No.: US 11,445,041 B2
(45) Date of Patent: Sep. 13, 2022

(54) METHODS AND SYSTEMS OF SERVICE AREA BASED NETWORK DEVICE CONFIGURATION

(71) Applicant: Nile Global, Inc., Cupertino, CA (US)

(72) Inventors: Suresh Katukam, Milpitas, CA (US); Steve Alexander, Woodside, CA (US); Vijay Bollapragada, Bangalore (IN); Promode Nedungadi, San Jose, CA (US)

(73) Assignee: Nile Global, Inc., San Jose, CA (US)

( * ) Notice: Subject to any disclaimer, the term of this patent is extended or adjusted under 35 U.S.C. 154(b) by 69 days.

(21) Appl. No.: 17/134,027

(22) Filed: Dec. 24, 2020

(65) Prior Publication Data

US 2022/0210235 A1 Jun. 30, 2022

(51) Int. Cl.
*H04L 67/52* (2022.01)
*H04L 41/5041* (2022.01)
*H04L 41/22* (2022.01)
*H04L 67/10* (2022.01)
*H04L 41/0806* (2022.01)
*H04L 41/14* (2022.01)
*H04W 64/00* (2009.01)

(52) U.S. Cl.
CPC .......... *H04L 67/52* (2022.05); *H04L 41/0806* (2013.01); *H04L 41/145* (2013.01); *H04L 41/22* (2013.01); *H04L 41/5041* (2013.01); *H04L 67/10* (2013.01); *H04W 64/003* (2013.01)

(58) Field of Classification Search
CPC .......... H04L 41/08–0836; H04L 41/22; H04L 41/14–149
See application file for complete search history.

(56) References Cited

U.S. PATENT DOCUMENTS

| | | | | |
|---|---|---|---|---|
| 7,542,572 | B2 * | 6/2009 | Meier | H04L 41/28 726/1 |
| 8,068,441 | B1 * | 11/2011 | Wiedmann | H04L 41/12 455/418 |
| 8,887,262 | B1 | 11/2014 | Turner et al. | |
| 9,173,115 | B2 | 10/2015 | Sundareswaran et al. | |
| 9,769,734 | B2 | 9/2017 | Goto | |
| 10,477,511 | B2 * | 11/2019 | Ohlarik | H04W 4/027 |
| 10,928,785 | B2 * | 2/2021 | Tiwari | G06Q 10/04 |
| 11,122,443 | B2 * | 9/2021 | Desai | H04W 16/20 |
| 11,228,493 | B1 * | 1/2022 | Katukam | H04L 61/6022 |

(Continued)

FOREIGN PATENT DOCUMENTS

WO WO-2004086783 A1 * 10/2004 ......... H04L 41/0823

*Primary Examiner* — Brendan Y Higa
(74) *Attorney, Agent, or Firm* — Loza & Loza, LLP

(57) ABSTRACT

Embodiments of a device and method are disclosed. In an embodiment, a method of network device configuration involves at a cloud server, generating a user interface to obtain user input information regarding service area configuration in a floor plan of a customer site, at the cloud server, receiving location information of a network device at the customer site, at the cloud server, automatically determining service area specific configuration of the network device based on the service area configuration in the floor plan of the customer site and the location information of the network device, and from the cloud server, transmitting the service area specific configuration to the network device.

20 Claims, 14 Drawing Sheets

(56) References Cited

U.S. PATENT DOCUMENTS

| | | | |
|---|---|---|---|
| 11,258,678 B1* | 2/2022 | Katukam | H04L 67/10 |
| 2002/0129138 A1* | 9/2002 | Carter | H04L 41/22 |
| | | | 709/224 |
| 2005/0059405 A1* | 3/2005 | Thomson | H04W 16/18 |
| | | | 455/446 |
| 2014/0278281 A1 | 9/2014 | Vaynriber et al. | |
| 2015/0172118 A1 | 6/2015 | Lin | |
| 2015/0229488 A1* | 8/2015 | Averitt | H04W 4/33 |
| | | | 700/275 |
| 2016/0014613 A1* | 1/2016 | Ponnampalam | H04L 41/0823 |
| | | | 370/254 |
| 2016/0323140 A1* | 11/2016 | Ponnuswamy | H04L 41/0813 |
| 2017/0245108 A1* | 8/2017 | Slater | H04W 4/021 |
| 2017/0339584 A1* | 11/2017 | Ketonen | H04L 41/5019 |
| 2017/0374560 A1* | 12/2017 | Judge | H04W 16/20 |
| 2018/0120973 A1 | 5/2018 | Tiwari et al. | |
| 2018/0352386 A1* | 12/2018 | Gunasekara | G06F 30/13 |
| 2019/0052523 A1* | 2/2019 | Jawaharlal | H04L 41/22 |
| 2019/0116504 A1* | 4/2019 | Rusackas | H04L 41/22 |
| 2020/0067767 A1* | 2/2020 | Parangattil | H04W 88/08 |
| 2020/0267498 A1* | 8/2020 | Draper | G06F 16/29 |
| 2020/0322826 A1* | 10/2020 | Wangler | H04L 67/20 |
| 2021/0258392 A1* | 8/2021 | Tiwari | H04L 12/2803 |
| 2021/0297317 A1* | 9/2021 | Thompson | H04L 41/22 |

* cited by examiner

METHODS AND SYSTEMS OF SERVICE AREA BASED NETWORK DEVICE CONFIGURATION

BACKGROUND

Location specific services are commonly used in communications networks, for example, in enterprise networks, to provide services to different network devices. A typical workflow for performing location-based services in an enterprise typically involves multiple time consuming and error-prone steps. For example, a typical workflow for performing location-based services in an enterprise requires that a business owner in the enterprise defines what services are needed per location in a document format and that a network administrator creates configuration templates and manually applies the configuration templates to network devices in the enterprise. Consequently, network deployment can be a lengthy process, which can take several weeks to months to bring up a network at a customer site. Therefore, there is a need for location specific service technology that can automatically determine location specific configuration of a network device for providing a desired location based service to the network device.

SUMMARY

Embodiments of a device and method are disclosed. In an embodiment, a method of network device configuration involves at a cloud server, generating a user interface to obtain user, at the cloud server, receiving location information of a network device at the customer site, at the cloud server, automatically determining service area specific configuration of the network device based on the service area configuration in the floor plan of the customer site and the location information of the network device, and from the cloud server, transmitting the service area specific configuration to the network device. Other embodiments are also described.

In an embodiment, the user interface includes a graphical user interface (GUI).

In an embodiment, the service area configuration in the floor plan of the customer site includes a space division of a floor in the floor plan of the customer site into service zones, and each of the service zones is a contiguous geographical area on the floor.

In an embodiment, the service area configuration in the floor plan of the customer site further includes network service configuration of the service zones.

In an embodiment, the network service configuration of the service zones includes information specifying network services in the service zones.

In an embodiment, the network service configuration of the service zones includes information specifying network services to be advertised in a single service zone of the service zones.

In an embodiment, the location information of the network device includes a deployed location of the network device at the customer site.

In an embodiment, the deployed location of the network device at the customer site includes coordinates of the network device on a floor in the floor plan of the customer site.

In an embodiment, at the cloud server, automatically determining the service area specific configuration of the network device based on the service area configuration in the floor plan of the customer site and the location information of the network device includes at the cloud server, mapping the coordinates of the network device on the floor in the floor plan of the customer site to one of a plurality of service zones on the floor.

In an embodiment, the method further includes at the cloud server, receiving network device information of the network device, where at the cloud server, automatically determining the service area specific configuration of the network device based on the service area configuration in the floor plan of the customer site and the location information of the network device includes at the cloud server, automatically determining the service area specific configuration of the network device based on the service area configuration in the floor plan of the customer site, the location information of the network device, and the network device information of the network device.

In an embodiment, a cloud server includes a customer information portal configured to generate a user interface to obtain user input information regarding service area configuration in a floor plan of a customer site and a device deployment module connected to the customer information portal. The device deployment module is configured to receive location information of a network device at the customer site, automatically determine service area specific configuration of the network device based on the service area configuration in the floor plan of the customer site and the location information of the network device, and transmit the service area specific configuration to the network device.

In an embodiment, the user interface includes a GUI.

In an embodiment, the service area configuration in the floor plan of the customer site includes a space division of a floor in the floor plan of the customer site into service zones, and each of the service zones is a contiguous geographical area on the floor.

In an embodiment, the service area configuration in the floor plan of the customer site further includes network service configuration of the service zones.

In an embodiment, the network service configuration of the service zones includes information specifying network services in the service zones.

In an embodiment, the location information of the network device includes a deployed location of the network device at the customer site.

In an embodiment, the deployed location of the network device at the customer site includes coordinates of the network device on a floor in the floor plan of the customer site.

In an embodiment, the device deployment module is further configured to map the coordinates of the network device on the floor in the floor plan of the customer site to one of a plurality of service zones on the floor.

In an embodiment, the device deployment module is further configured to receive network device information of the network device and automatically determine the service area specific configuration of the network device based on the service area configuration in the floor plan of the customer site, the location information of the network device, and the network device information of the network device.

In an embodiment, a method of network device configuration involves presenting a GUI to a user, where the GUI includes a floor plan of a customer site, receiving input information on the GUI from the user that creates a plurality of service areas on a floor in the floor plan of the customer site, and receiving network service configuration of the service areas on the GUI from the user.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
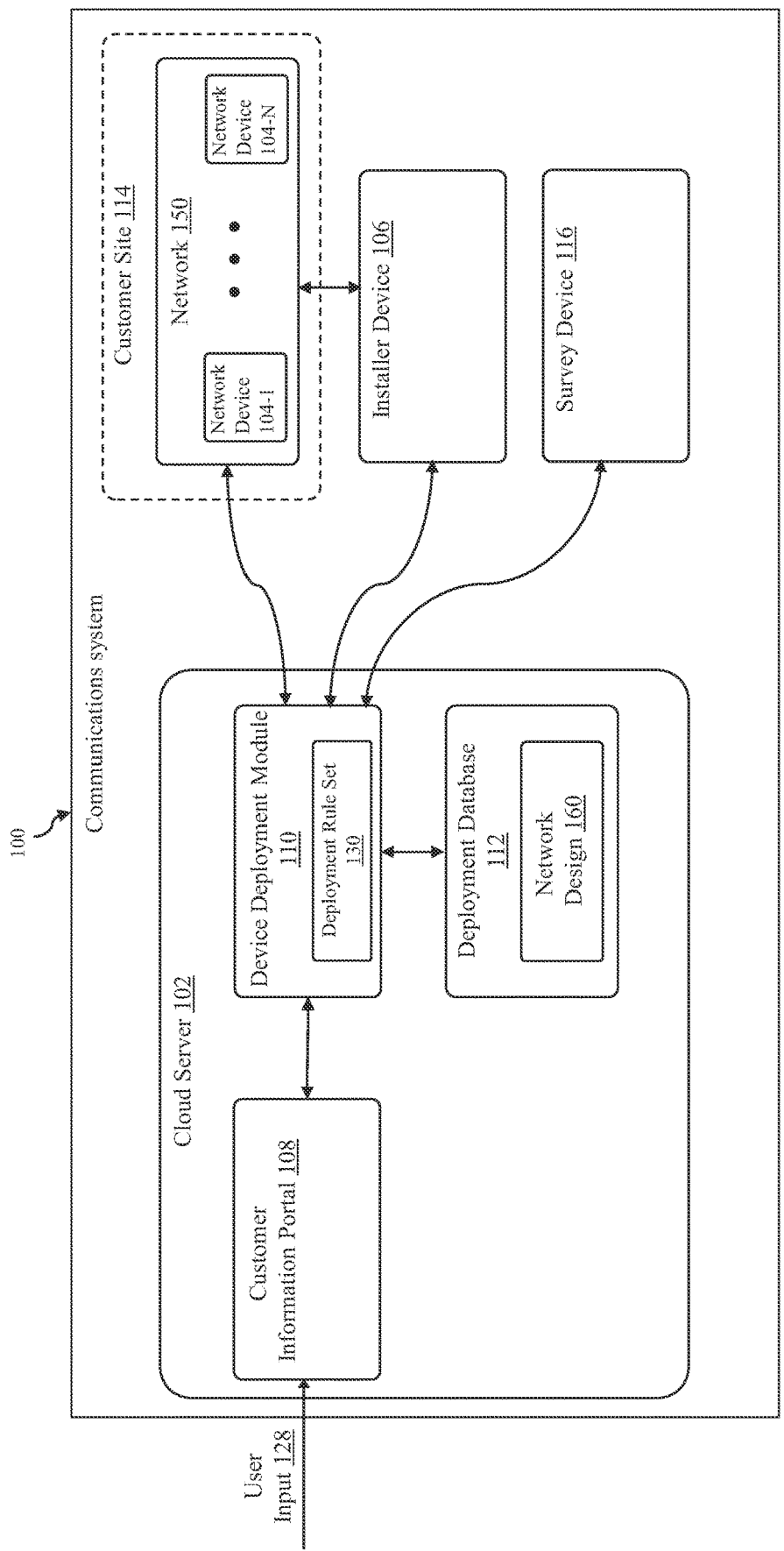
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102, a deployed network 150 within a customer site 114, an installer device 106, and a survey device 116. The cloud server, the network, the installer device, and/or the survey device may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, more than one customer site, more than one installer device, and/or more than one survey device. In another example, although the cloud server, the deployed network, the customer site, the installer device, and the survey device are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform location (e.g., service area) based network device configuration to network devices (e.g., the deployed network 150) at the customer site. Because the cloud server can facilitate or perform automatic service area based network device configuration of network devices at the customer site, network deployment efficiency and accuracy can be improved. In addition, because the cloud server can facilitate or perform automatic service area based network device configuration of network devices at the customer site, a user or customer (e.g., a layperson such as a worker on-site or an end-user such as an employee) at the customer site can set or modify service area based network device configuration for network devices to be deployed at the customer site herself or himself without the work of a network administrator of the cloud server 102. Consequently, network deployment time can be shortened and the labor cost for network deployment can be reduced. In some embodiments, the cloud server is configured to generate a user interface to obtain user input information regarding service area configuration in a floor plan of a customer site, to receive location information of a network device at the customer site, automatically determine service area specific configuration of the network device based on the service area configuration in the floor plan of the customer site and the location information of the network device, and to transmit the service area specific configuration to the network device. In some embodiments, the user interface includes a graphical user interface (GUI). In some embodiments, the service area configuration in the floor plan of the customer site includes a space division of a floor in the floor plan of the customer site into service zones, and each of the service zones is a contiguous geographical area on the floor. In some embodiments, the service area configuration in the floor plan of the customer site further includes network service configuration of the service zones. In some embodiments, the network service configuration of the service zones includes information specifying network services in the service zones. In some embodiments, the network service configuration of the service zones includes information specifying network services to be advertised in a single service zone of the service zones. In some embodiments, the location information of the network device includes a deployed location of the network device at the customer site. In some embodiments, the deployed location of the network device at the customer site includes coordinates of the network device on a floor in the floor plan of the customer site. In some embodiments, the cloud server is further configured to map the coordinates of the network device on the floor in the floor plan of the customer site to one of the service zones on the floor. In some embodiments, the cloud server is further configured to receive network device information of the network device and to automatically determine the service area specific configuration of the network device based on the service area configuration in the floor plan of the customer site, the location information of the network device, and the network device information of the network device. The cloud server may be implemented in hardware (e.g., circuits), software, firmware, or a combination thereof. In some embodiments, the cloud server is implemented on a server grade hardware platform, such as an x86 architecture platform. For example, the hardware platform of the cloud server may include conventional components of a computing device, such as one or more processors (e.g., CPUs), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations and other data.

In the embodiment depicted in FIG. 1, the cloud server includes a device deployment module 110, a customer information portal 108 connected to the device deployment module, and a deployment database 112 configured to store deployment data. The device deployment module, the customer information portal, and/or the deployment database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one device deployment module, more than one customer information portal, and/or more than one deployment database. In another example, although the device deployment module, the customer information portal, and the deployment database are shown in FIG. 1 as being connected in certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the server. In some embodiments, the device deployment module 110 is configured to facilitate or perform location (e.g., service area) based network device configuration to network devices (e.g., the deployed network 150) at the customer site 114, for example, using a deployment rule set 130. The deployment rule set 130 may include one or more device deployment rules for deploying network devices at the customer site 114, for example, for performing service area based network device configuration to network devices at the customer site 114. In some embodiments, the deployment database 112 is configured to store deployment data for a network deployed and/or to be deployed at the customer site (e.g., a list of network devices deployed or to be deployed at the customer site). For example, the deployment database 112 is configured to store a network design 160, which may include a list of network devices to be deployed and/or deployed at the customer site 114, a network topology of network devices and corresponding network configurations and/or location information (e.g., building information, floor information, and/or in-building location information) of the network devices. In some embodiments, the deployment database is configured to store a list of network devices deployed or to be deployed at the customer site and detailed information related to the network devices, for example, device type information of the network devices, deployment topology information that defines how network devices are connected to each other, and/or device location information (e.g., building information, floor information, and in-building location information) of network devices deployed or to be deployed at the customer site. In some embodiments, the device deployment module 110 is configured to perform service area based network device configuration to network devices (e.g., the deployed network 150) at the customer site 114 based on, for example, the network design 160 that is stored in the deployment database. The network design may include a list of network devices to be deployed at the customer site 114, a network topology of the network devices, and/or corresponding network configurations and/or or location information (e.g., building information, floor information, and/or in-building location information) of the network devices. Because the device deployment module can facilitate or perform automatic service area based network device configuration of network devices at the customer site, network deployment efficiency and accuracy can be improved. In addition, because the device deployment module can facilitate or perform automatic service area based network device configuration of network devices at the customer site, a user or customer (e.g., a layperson such as a worker on-site or an end-user such as an employee) at the customer site can set or modify service area based network device configuration for network devices to be deployed at the customer site herself or himself without the work of a network administrator of the cloud server 102. Consequently, network deployment time can be shortened and the labor cost for network deployment can be reduced. The customer information portal 108 is configured to receive customer input. In some embodiments, the customer information portal is configured to include or generate a user interface that allows a customer to input information associated with network design for the customer site 114, such as one or more specific requirements or restrictions. For example, the user interface (e.g., a GUI) may allow a customer to input information regarding service area configuration in a floor plan of a customer site (e.g., the customer site 114) that is specified in the network design of the customer site. In some embodiments, the customer information portal 108 is configured to present a GUI to a user, where the GUI includes a floor plan of a customer site, receive input information on the GUI from the user that creates service areas on a floor in the floor plan of the customer site, and receiving network service configuration of the service areas on the GUI from the user. Using the GUI, a user or customer (e.g., a layperson such as a worker on-site or an end-user such as an employee) at the customer site can define service areas graphically on a floor plan and the cloud server 102 (e.g., the device deployment module 110) can automatically determine server area based configuration for a network device based on the deployed location of the network device.

In some embodiments, the customer information portal 108 is configured to generate a user interface to obtain user input information (e.g., user or customer input 128) regarding service area configuration in a floor plan of a customer site (e.g., the customer site 114). The device deployment module may be configured to receive location information of a network device at the customer site, automatically determine service area specific configuration of the network device based on the service area configuration in the floor plan of the customer site and the location information of the network device, and to transmit the service area specific configuration to the network device. In some embodiments, the user interface includes a GUI. In some embodiments, the service area configuration in the floor plan of the customer site includes a space division of a floor in the floor plan of the customer site into service zones, and each of the service zones is a contiguous geographical area on the floor. In some embodiments, the service area configuration in the floor plan of the customer site further includes network service configuration of the service zones. In some embodiments, the network service configuration of the service zones includes information specifying network services in the service zones. In some embodiments, the network service configuration of the service zones includes information specifying network services to be advertised in a single service zone of the service zones. In some embodiments, the location information of the network device includes a deployed location of the network device at the customer site. In some embodiments, the deployed location of the network device at the customer site includes coordinates of the network device on a floor in the floor plan of the customer site. In some embodiments, the device deployment module is further configured to map the coordinates of the network device on the floor in the floor plan of the customer site to one of the service zones on the floor. In some embodiments, the device deployment module is further configured to receive network device information of the network device and to automatically determine the service area specific configuration of the network device based on the service area configuration in the floor plan of the customer site, the location information of the network device, and the network device information of the network device.

Figure 2:
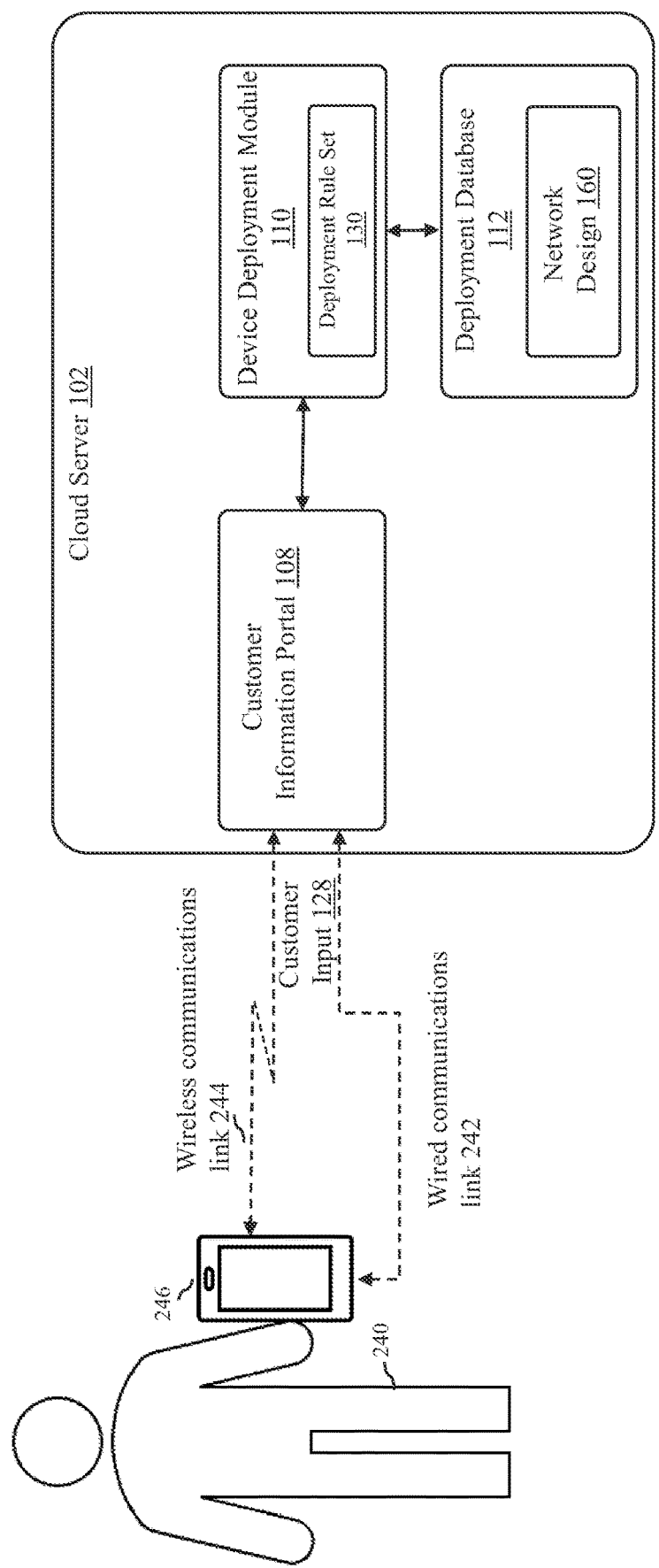
FIG. 2 depicts a user having a user device communicating with a customer information portal of a cloud server of the communications system depicted in FIG. 1.

FIG. 2 depicts a user 240 having a user device 246 communicating with the customer information portal 108 of the cloud server 102 of the communications system 100 depicted in FIG. 1. The user or customer may be a layperson such as a worker on-site or an end-user such as an employee at the customer site 114. In the embodiment depicted in FIG. 2, the user device communicates wirelessly with the customer information portal through a wireless communications link 244 and/or communicates with the customer information portal through a wired communications link 242 (e.g., a wire or network cable) to receive the user or customer input 128. In some embodiments, the user device is a wireless and/or wired communications device that includes at least one screen (e.g., a touch screen), at least one processor (e.g., a microcontroller, a DSP, and/or a CPU), at least one wired and/or wireless communications transceiver, at least one wired and/or wireless communications interface, and/or at least one optional antenna. In some embodiments, the user device is a handheld wireless device, such as a cellular phone or a mobile phone (e.g., a smart phone), a pad computer, a Personal Digital Assistant (PDA) etc. that supports one or more radio frequency (RF) communications protocols, including without limitation, Bluetooth, The Global System for Mobile Communications (GSM), Universal Mobile Telecommunications System (UMTS), Code Division Multiple Access (CDMA), Worldwide Interoperability for Microwave Access (WiMax) and communications protocols as defined by the 3rd Generation Partnership Project (3GPP) or the 3rd Generation Partnership Project 2 (3GPP2), 4G Long Term Evolution (LTE), the fifth generation technology standard for broadband cellular network (5G), and IEEE 802.16 standards bodies and/or one or more wireless local area network (WLAN) communications protocols, such as an IEEE 802.11 protocol. In some embodiments, the user device communicates wirelessly with the customer information portal through Internet. In an example operation, the user uses the user device 246 to access a graphical user interface (GUI) presented by the customer information portal and graphically set (e.g., use a finger to select or slide on the GUI) service areas on a floor of a building in the customer site 114, e.g., using a software application or App installed on the user device (e.g., a mobile phone or tablet).

Turning back to the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a central processing unit (CPU)), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N may be compatible with Institute of Electrical and Electronics Engineers (IEEE) 802.3 protocol and/or one or more wireless local area network (WLAN) communications protocols, such as IEEE 802.11 protocol. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, at least one of the one or more network devices 104-1, . . . , 104-N is a wireless station (STA) that wirelessly connects to a wireless AP. For example, at least one of the one or more network devices 104-1, . . . , 104-N may be a laptop, a desktop personal computer (PC), a mobile phone, or other wireless device that supports at least one WLAN communications protocol (e.g., an IEEE 802.11 protocol)).

Figure 3:
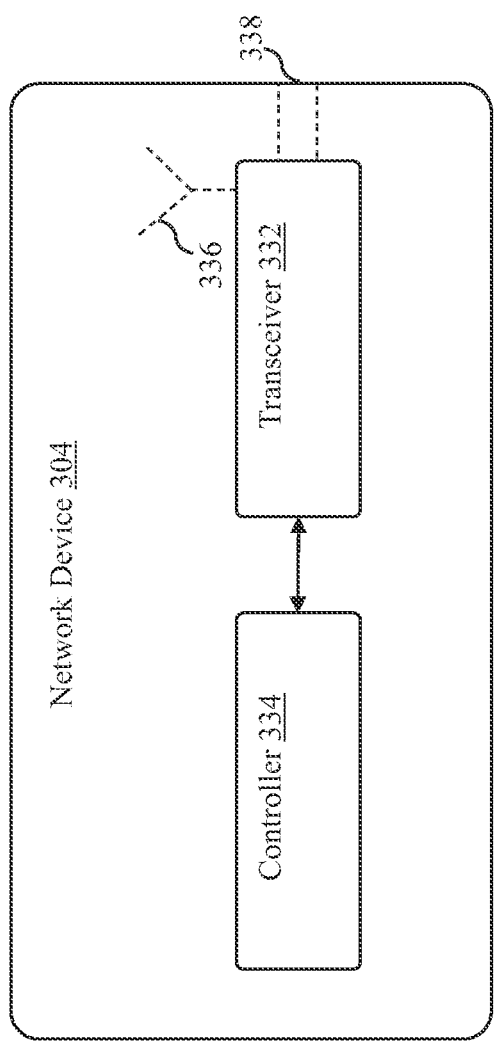
FIG. 3 depicts an embodiment of a network device of the communications system depicted in FIG. 1.

FIG. 3 depicts an embodiment of a network device 304 of the communications system 100 depicted in FIG. 1. The network device 304 may be an embodiment of the one or more network devices 104-1, . . . , 104-N that are included in the deployed network 150 depicted in FIG. 1. However, the one or more network devices 104-1, . . . , 104-N that are included in the deployed network 150 depicted in FIG. 1 are not limited to the embodiment depicted in FIG. 3. The network device 304 may be any suitable type of network device, e.g., a distribution switch, a gateway, an access switch, a wireless access point, or a sensor. In the embodiment depicted in FIG. 3, the network device 304 includes a wireless and/or wired transceiver 332, a controller 334 (e.g., a microcontroller, a DSP, and/or a CPU) operably connected to the transceiver 332, at least one optional antenna 336 operably connected to the transceiver 332, and at least one optional network port 338 operably connected to the transceiver 332. In some embodiments, the transceiver 332 includes a physical layer (PHY) device. The transceiver 332 may be any suitable type of transceiver. For example, the transceiver 332 may be a short-range communications transceiver (e.g., a Bluetooth) or a LAN transceiver (e.g., a transceiver compatible with an IEEE 802.11 protocol). In some embodiments, the network device 304 includes multiple transceivers, for example, a short-range communications transceiver (e.g., a Bluetooth) and a LAN transceiver (e.g., a transceiver compatible with an IEEE 802.11 protocol). The controller 334 may be configured to control the transceiver 332 to process packets received through the antenna 336 and/or the network port 338 and/or to generate outgoing packets to be transmitted through the antenna 336 and/or the network port 338. The antenna 336 may be any suitable type of antenna. For example, the antenna 336 may be an induction type antenna such as a loop antenna or any other suitable type of induction type antenna. However, the antenna 336 is not limited to an induction type antenna. The network port 338 may be any suitable type of port. For example, the network port 338 may be a local area network (LAN) network port such as an Ethernet port. However, the network port 338 is not limited to LAN network ports.

Turning back to the communications system 100 depicted in FIG. 1, the installer device 106 may be any type of suitable network device that is used by an operator to facilitate the deployment of network devices (e.g., the network 150) at the customer site 114. In some embodiments, the installer device may be fully or partially implemented as an IC device. In some embodiments, the installer device is a wireless communications device that includes at least one processor (e.g., a microcontroller, a DSP, and/or a CPU), at least one wireless communications transceiver, at least one wireless communications interface, and/or at least one antenna and that supports at least one wireless communications protocol. In some embodiments, the installer device is a handheld wireless device, such as a cellular phone or a mobile phone (e.g., a smart phone), a pad computer, a PDA etc. that supports one or more RF communications protocols, including without limitation, Bluetooth, GSM, UMTS, CDMA, WiMax and communications protocols as defined by 3GPP or 3GPP2, 4G LTE, 5G, and IEEE 802.16 standards bodies and/or one or more WLAN communications protocols, such as an IEEE 802.11 protocol. For example, the installer device 106 is a wireless communications device, such as a handheld wireless device (e.g., cellular phone or a mobile phone) that supports multiple communications protocols, which may include at least one cellular communications protocol and at least short-range communications protocol (e.g., Bluetooth). In some embodiments, network device deployment software application or App is installed on the installer device 106 (e.g., a mobile phone or tablet). In some embodiments, the installer device is configured to receive an installation job for deploying a network at a customer site, to scan a code of a network device at the customer site to obtain network device information, and to send the network device information and location information of the network device at the customer site to the cloud server 102.

Figure 4:
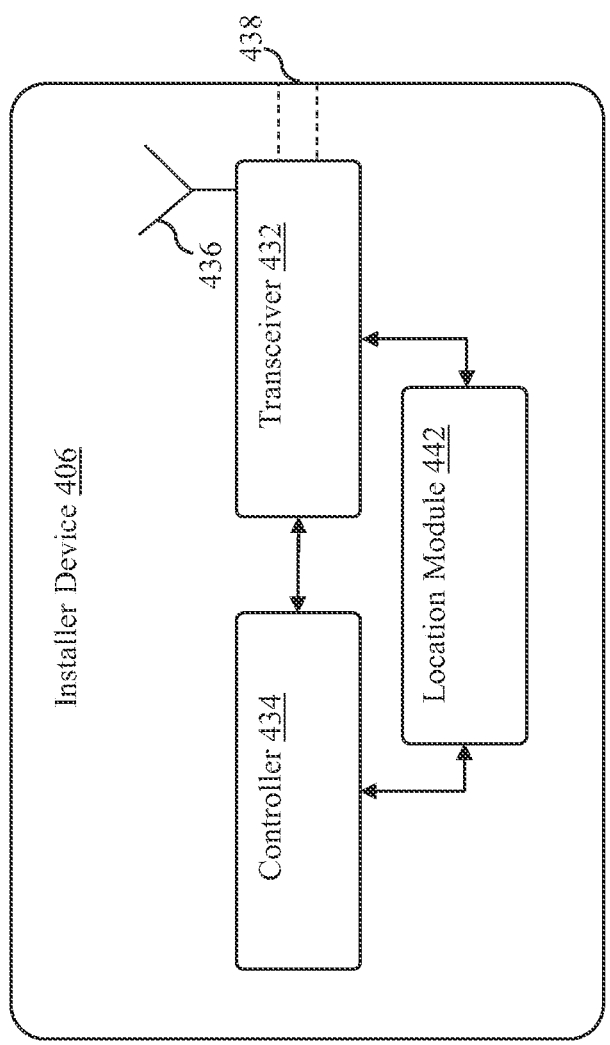
FIG. 4 depicts an embodiment of an installer device of the communications system depicted in FIG. 1.

FIG. 4 depicts an embodiment of an installer device 406 of the communications system 100 depicted in FIG. 1. The installer device 406 depicted in FIG. 4 is an embodiment of the installer device 106 depicted in FIG. 1. However, the installer device 106 depicted in FIG. 1 are not limited to the embodiment depicted in FIG. 4. In the embodiment depicted in FIG. 4, an installer device 406 includes a wireless and/or wired transceiver 432, a controller 434 (e.g., a microcontroller, a DSP, and/or a CPU) operably connected to the transceiver 432, at least one antenna 436 operably connected to the transceiver 432, at least one optional network port 438 operably connected to the transceiver 432, and a location module 442. In some embodiments, the installer device 406 is a handheld wireless device, such as a cellular phone or a mobile phone (e.g., a smart phone), a pad computer, a PDA etc. that supports one or more RF communications protocols. In some embodiments, the transceiver 432 includes a physical layer (PHY) device. The transceiver 432 may be any suitable type of transceiver. For example, the transceiver 432 may be a short-range communications transceiver (e.g., a Bluetooth) or a LAN transceiver (e.g., a transceiver compatible with an IEEE 802.11 protocol). In some embodiments, the installer device 406 includes multiple transceivers, for example, a short-range communications transceiver (e.g., a Bluetooth) and a LAN transceiver (e.g., a transceiver compatible with an IEEE 802.11 protocol). The controller 434 may be configured to control the transceiver 432 to process packets received through the antenna 436 and/or the network port 438 and/or to generate outgoing packets to be transmitted through the antenna 436 and/or the network port 438. The antenna 336, which may be optional in some implementations, may be any suitable type of antenna. For example, the antenna 436 may be an induction type antenna such as a loop antenna or any other suitable type of induction type antenna. However, the antenna 436 is not limited to an induction type antenna. The network port 438 may be any suitable type of port. For example, the network port 438 may be a local area network (LAN) network port such as an Ethernet port. However, the network port 438 is not limited to LAN network ports. The location module 442 is configured to determine or obtain location information of the installer device or a device that is associated with (e.g., connected with or in the vicinity of) the installer device. Examples of location information that can be determined or obtained by the location module 442 include without being limited to, address information in a map/navigation system, coordinate information in a map/navigation system, latitude and longitude information in a map/navigation system, and relative positional information in a map/navigation system. In some embodiments, the location information that can be determined or obtained by the location module 442 includes one or more X, Y coordinates and/or Global Positioning System (GPS) coordinates or other global or satellite location system coordinates. In some embodiments, the location module 442 is a GPS or other global or satellite location system module that includes a GPS receiver or other global or satellite. In some embodiments, the location module 442 uses location techniques such as triangulation or in-door beacon based location technique to determine or obtain location information of the installer device or a device that is associated with (e.g., connected with or in the vicinity of) the installer device.

Turning back to the communications system 100 depicted in FIG. 1, the survey device 116 may be any type of suitable network device that is used by a technician to facilitate network design for the customer site 114. The survey device may be fully or partially implemented as an IC device. In some embodiments, the survey device is a computing device that includes at least one processor (e.g., a microcontroller, a DSP, and/or a CPU), at least one communications transceiver, and at least one communications interface and that supports at least one communications protocol. For example, the survey device is a wireless communications device that includes at least one wireless communications transceiver, at least one wireless communications interface, and/or at least one antenna and that supports at least one wireless communications protocol. In some embodiments, the survey device is a handheld wireless device, such as a cellular phone or a mobile phone (e.g., a smart phone), a pad computer, a PDA etc. that supports one or more radio frequency (RF) communications protocols, including without limitation, GSM, UMTS, CDMA, WiMax and communications protocols as defined by 3GPP or 3GPP2, 4G LTE, 5G, and IEEE 802.16 standards bodies and/or one or more WLAN communications protocols, such as IEEE 802.11 protocol. In some embodiments, site survey software (e.g., a commonly used Wi-Fi design and spectrum analysis software or App) is installed on the survey device (e.g., a mobile phone or tablet). In some embodiments, the survey device may include a special-purpose device (e.g., a spectrum analyzer device) configured to measure the wireless signal strength at the customer site. Site survey information that is generated by the survey device may include wired connectivity information for the customer site, such as the number of wired port(s), type of wired port(s) (e.g., power over ethernet (PoE) vs. non-PoE), and/or the location(s) of port(s) available at the customer site and/or to be newly installed at the customer site, and/or wireless connectivity information for the customer site, such as the number of wireless APs available at the customer site and/or to be newly installed at the customer site to deliver the coverage and capacity required for the customer site.

Figure 5:
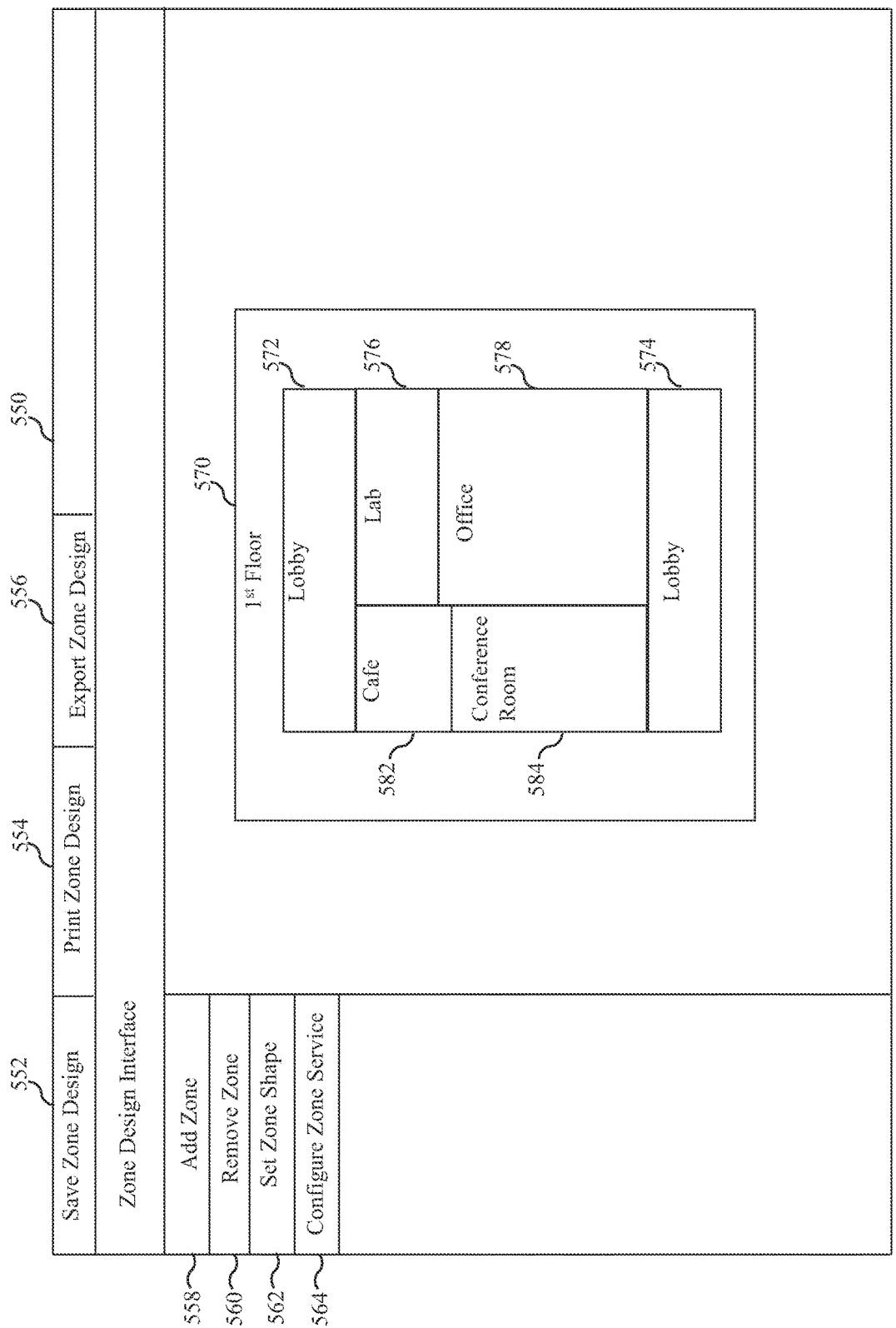
FIGS. 5-11 depict some example graphical user interfaces (GUIs) that can be used to obtain user input information regarding service area configuration in a floor plan of a customer site.

FIGS. 5-11 depict some example GUIs that can be used to obtain user input information regarding service area configuration in a floor plan of a customer site (e.g., the customer site 114). Specifically, FIG. 5 illustrates a zone design GUI 550 used by a user or customer (e.g., a layperson such as a worker on-site or an end-user such as an employee) at the customer site to input service area configuration in a floor plan of the customer site. In the embodiment depicted in FIG. 5, the zone design GUI 550 includes a "Save Zone Design" button 552 that allows the user to save a service zone design on a floor plan, a "Print Zone Design" button 554 that allows the user to print a service zone design on a floor plan, an "Export Zone Design" button 556 that allows the user to export a service zone design, an "Add Zone" button 558 that allows the user to add a service zone in a floor plan, a "Remove Zone" button 560 that allows the user to remove a service zone in a floor plan, a "Set Zone Shape" button 562 that allows the user to set the shape of a service zone in a floor plan, and a "Configure Zone Service" button 564 that allows the user to configure at least one network service in a service zone in a floor plan. In the embodiment depicted in FIG. 5, the zone design GUI 550 also includes a floor plan area 570 that contains lobbies 572, 574, a lab 576, an officer 578, a café 582, and a conference room 584 in a floor of a building at the customer site. A user or customer (e.g., a layperson such as a worker on-site or an end-user such as an employee of an enterprise) at the customer site can define service areas or zones in the floor plan area 570 graphically from the GUI 550. Each service zone is a polygon shape that represents a space on a floor. Each service zone may be a contiguous geographical area on a floor of a building that corresponding to the floor plan area 570. For example, a lobby, a café, or a conference room may be designated as a service zone. A floor may have zero service zone or multiple service zones. In some embodiments, a floor includes multiple instances of one service zone. For example, a lobby service zone may include two lobbies (e.g., the lobbies 572, 574) that are present at two ends of a floor. Although the zone design GUI 550 is shown with certain components, other embodiments of the zone design GUI 550 may include fewer or more components. In addition, although the floor plan area 570 is shown with certain portions with certain shapes, other embodiments of the floor plan area 570 may include fewer or more portions with the same shapes or different shapes.

Figure 6:
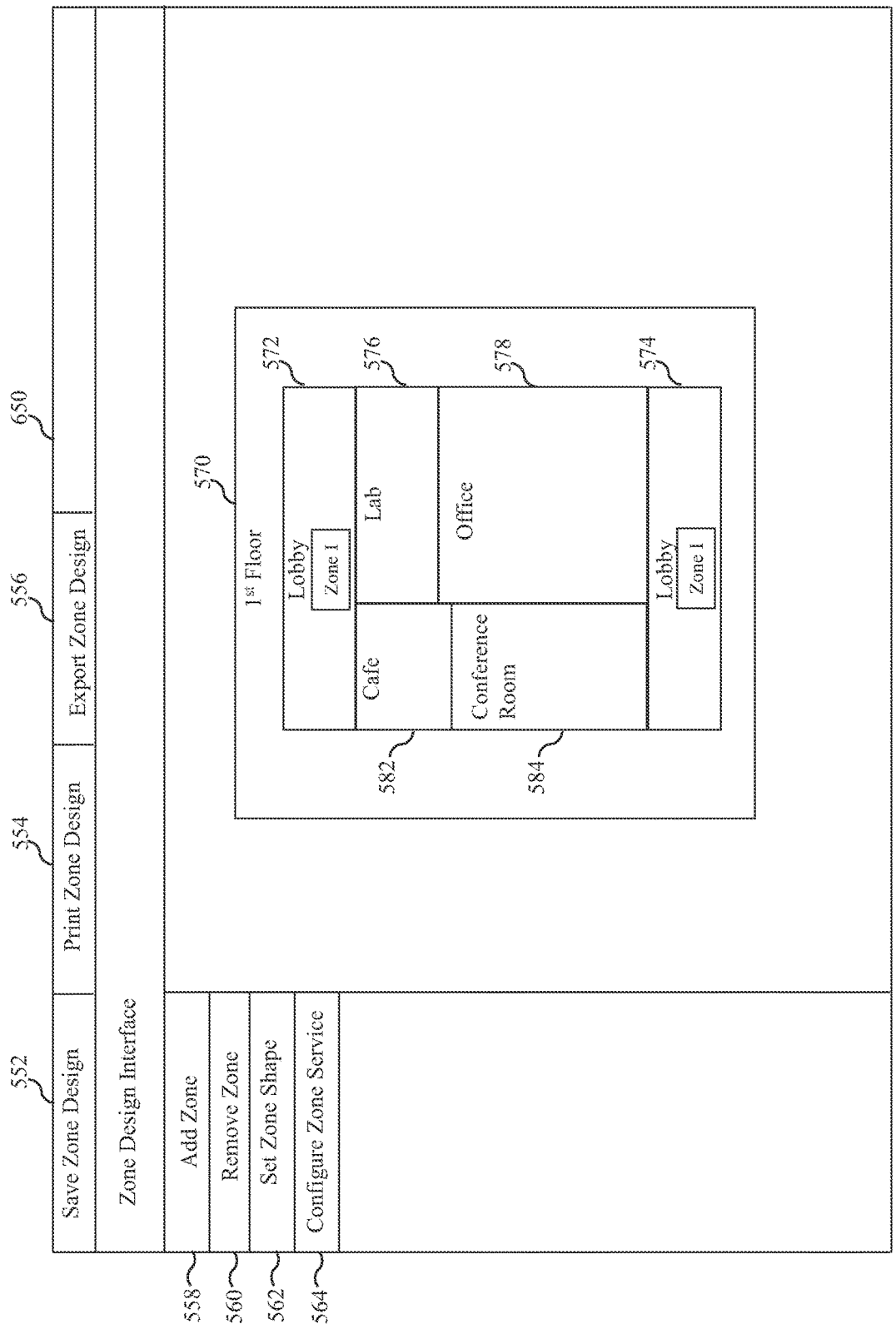

FIG. 6 illustrates a GUI 650 that is the result of setting a service zone on the floor plan area 570 of the zone design GUI 550 depicted in FIG. 5. In the embodiment depicted in FIG. 6, a user or customer (e.g., a layperson such as a worker on-site or an end-user such as an employee of an enterprise) at the customer site 114 designates service zone I as including the lobbies 572, 574 in the floor plan area 570, for example, by pressing the "Add Zone" button 558. In some embodiments, each service zone in the floor plan area 570 is filled by a different color, a different shade, and/or a different pattern.

Figure 7:
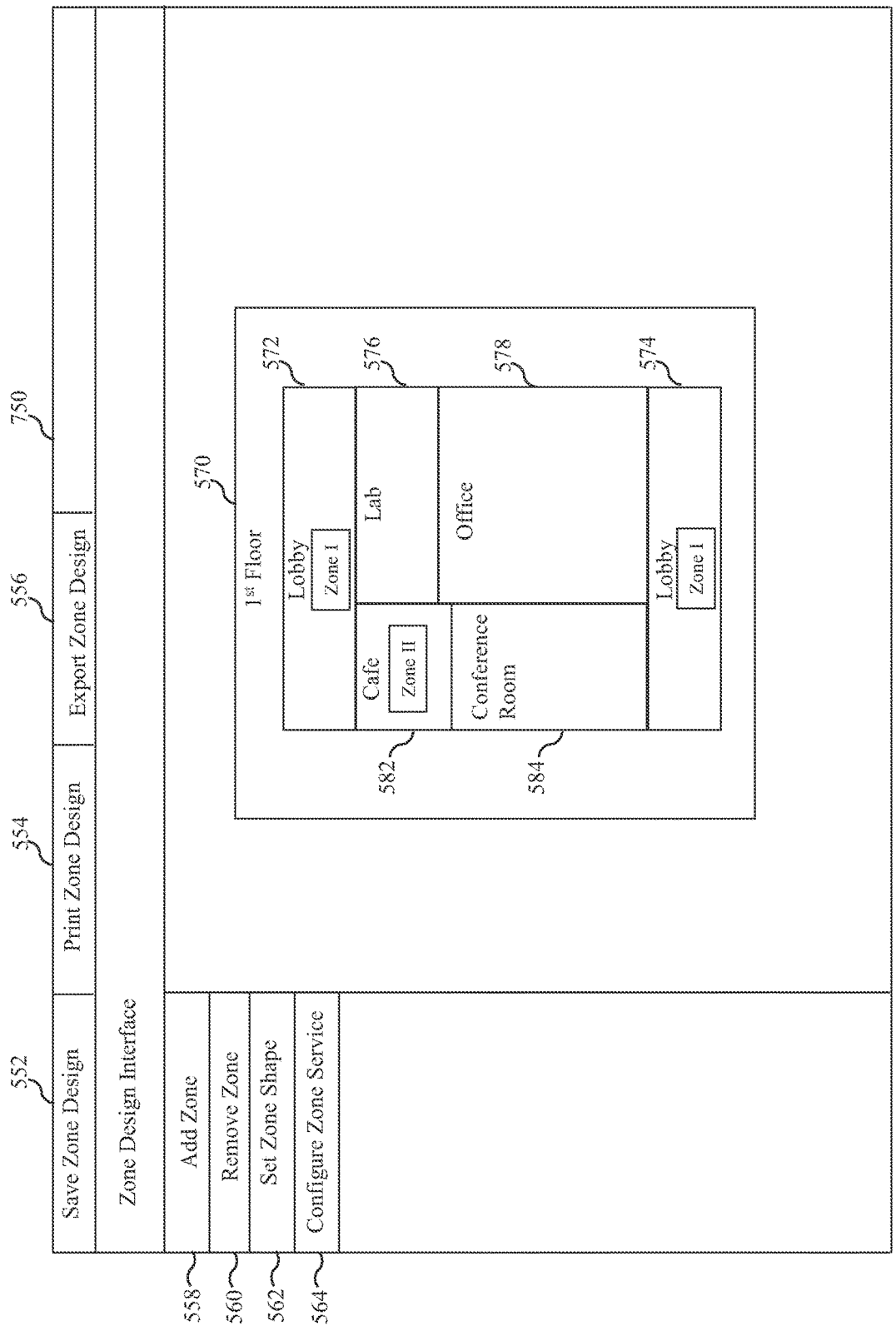

FIG. 7 illustrates a GUI 750 that is the result of setting another service zone on the floor plan area 570 of the GUI 650 depicted in FIG. 6. In the embodiment depicted in FIG. 7, a user or customer (e.g., a layperson such as a worker on-site or an end-user such as an employee of an enterprise)

at the customer site 114 designates service zone II as including the café 582 in the floor plan area 570, for example, by pressing the "Add Zone" button 558.

Figure 8:
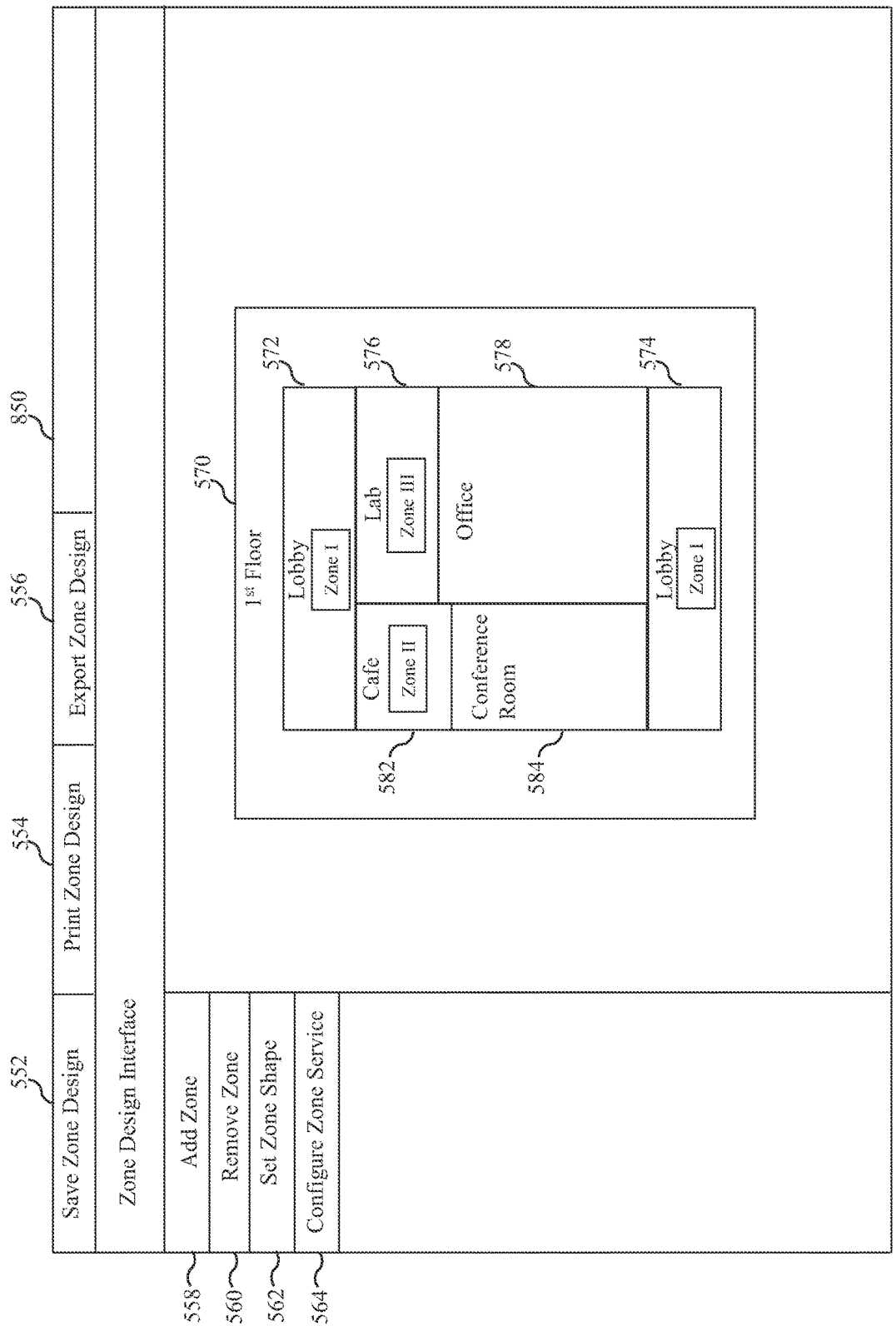

FIG. 8 illustrates a GUI 850 that is the result of setting another service zone on the floor plan area 570 of the GUI 750 depicted in FIG. 7. In the embodiment depicted in FIG. 8, a user or customer (e.g., a layperson such as a worker on-site or an end-user such as an employee of an enterprise) at the customer site 114 designates service zone II as including the café 582 in the floor plan area 570, for example, by pressing the "Add Zone" button 558.

Figure 9:
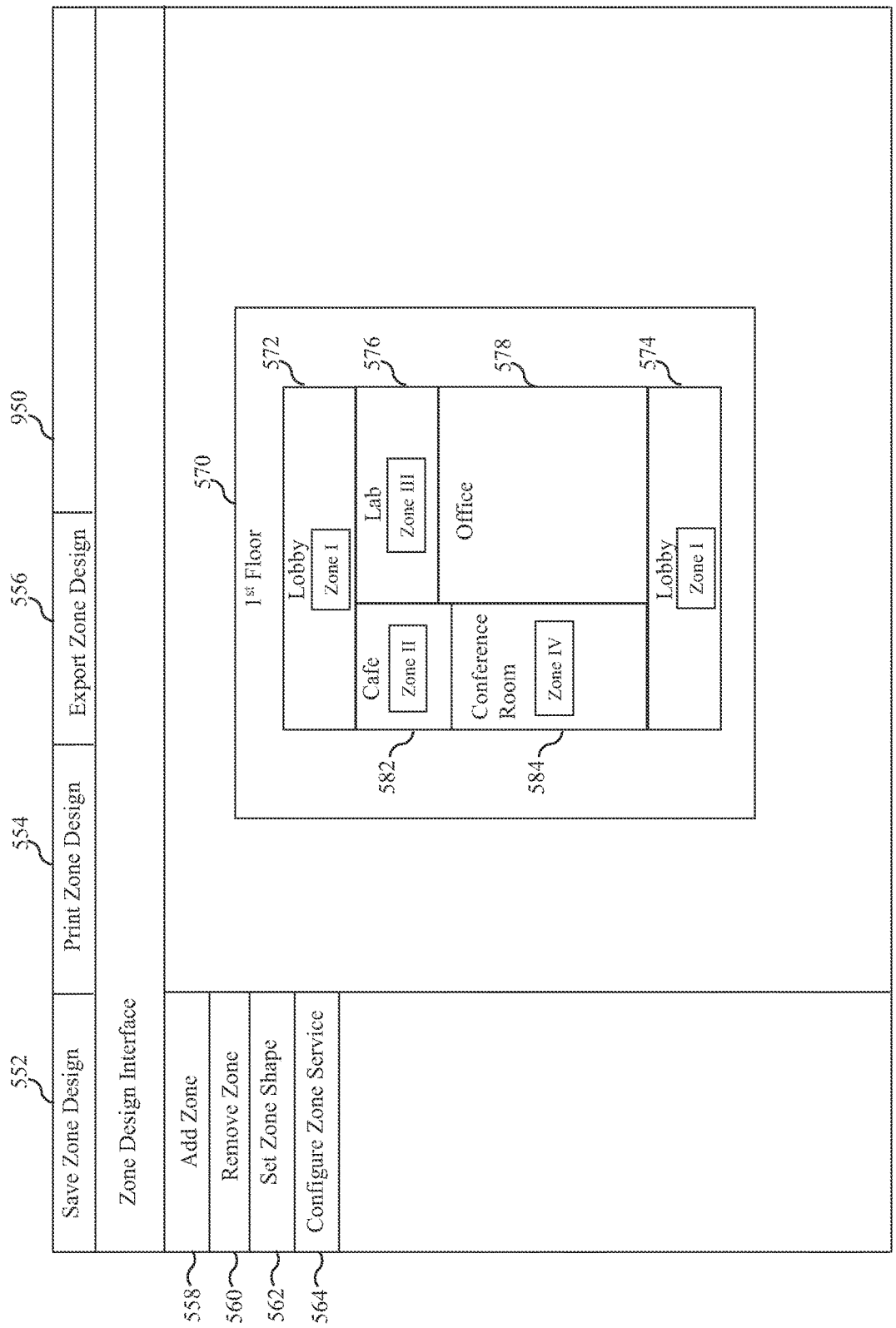

FIG. 9 illustrates a GUI 950 that is the result of setting another service zone on the floor plan area 570 of the GUI 850 depicted in FIG. 8. In the embodiment depicted in FIG. 9, a user or customer (e.g., a layperson such as a worker on-site or an end-user such as an employee of an enterprise) at the customer site 114 designates service zone IV as including the conference room 584 in the floor plan area 570, for example, by pressing the "Add Zone" button 558.

Figure 10:
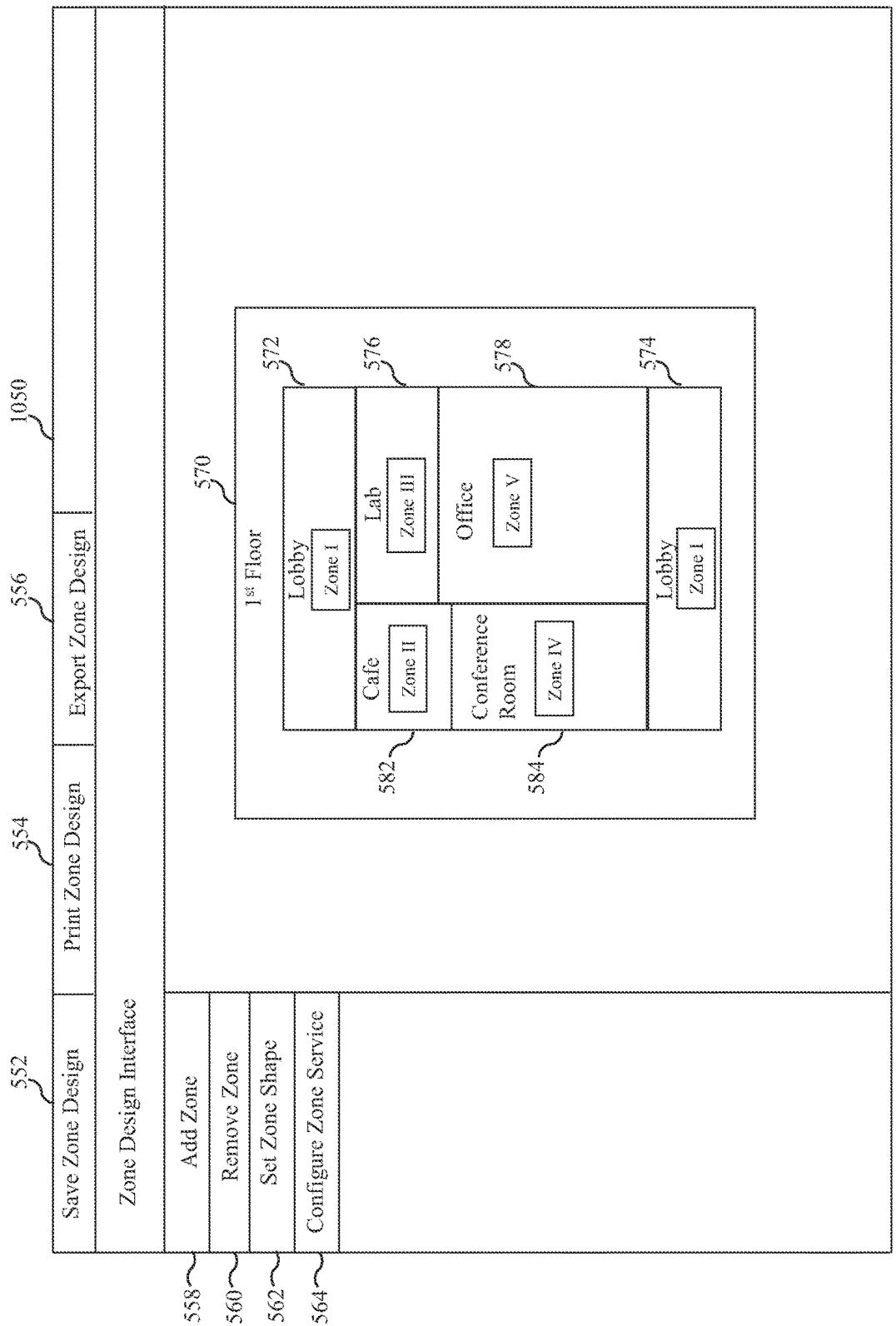

FIG. 10 illustrates a GUI 1050 that is the result of setting another service zone on the floor plan area 570 of the GUI 950 depicted in FIG. 9. In the embodiment depicted in FIG. 10, a user or customer (e.g., a layperson such as a worker on-site or an end-user such as an employee of an enterprise) at the customer site 114 designates service zone IV as including the office 578 in the floor plan area 570, for example, by pressing the "Add Zone" button 558. In some embodiments, each service zone in the floor plan area 570 is filled by a different color, a different shade, and/or a different pattern.

A user or customer (e.g., a layperson such as a worker on-site or an end-user such as an employee of an enterprise) at the customer site 114 can advertise a specific set of wireless services in service zones. For example, a lobby may have a guest wireless service with a first network name (e.g., a first service set identifier (SSID)), while a lab may have lab wireless service with a second network name (e.g., a second SSID). In some embodiments, a service zone has more than one wireless service. For example, a lobby may have an employee wireless service and a guest wireless service with different network names (e.g., different SSIDs).

Figure 11:
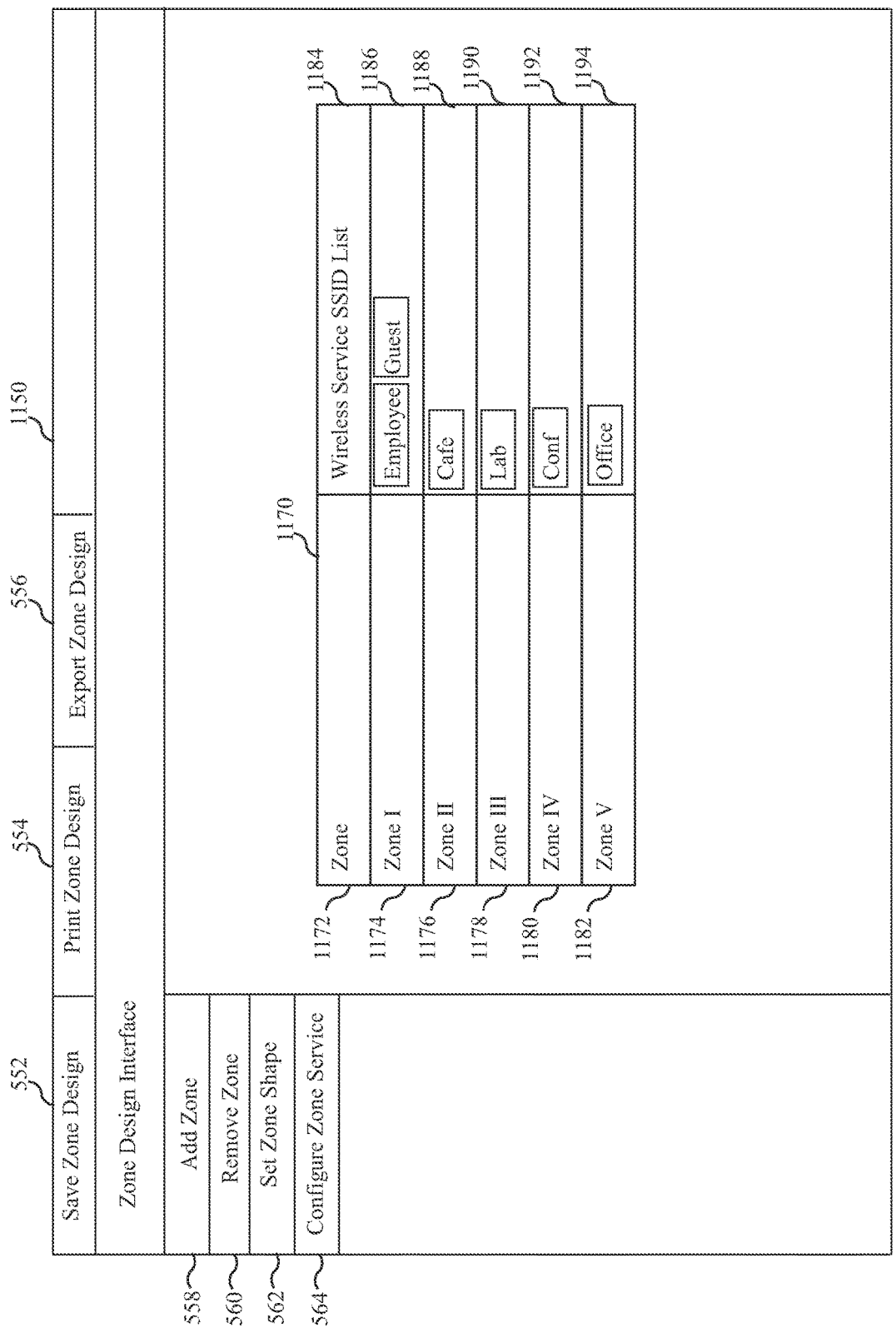

FIG. 11 illustrates a GUI 1150 that is the result of setting wireless services for different service zones on the floor plan area 570 of the GUI 1050 depicted in FIG. 10. A user or customer (e.g., a layperson such as a worker on-site or an end-user such as an employee of an enterprise) at the customer site 114 designates network services for the service zones in the floor plan area 570, for example, by pressing the "Configure Zone Service" button 564. In the embodiment depicted in FIG. 11, the GUI 1150 includes a wireless service area 1170 that contains wireless service SSIDs for the service zones I, II, III, IV, and V in the GUI 1050 depicted in FIG. 10, represented in areas 1172, 1174, 1176, 1178, 1180, 1182, 1184, 1186, 1188, 1190, 1192, 1194. Specifically, two wireless networks with SSIDs "Employee" and "Guest" are advertised, provided, or offered to service zone I, a wireless network with SSID "Cafe" is advertised, provided, or offered to service zone II, a wireless network with SSID "Lab" is advertised, provided, or offered to service zone III, a wireless network with SSID "Conf" is advertised, provided, or offered to service zone IV, and a wireless network with SSID "Office" is advertised, provided, or offered to service zone V. Because each service zone has at least one dedicated wireless network, different network services can be provided to network devices in different service zones. In addition, by providing multiple wireless services to one service zone, different network services can be provided to network devices in one service zone.

Figure 12:
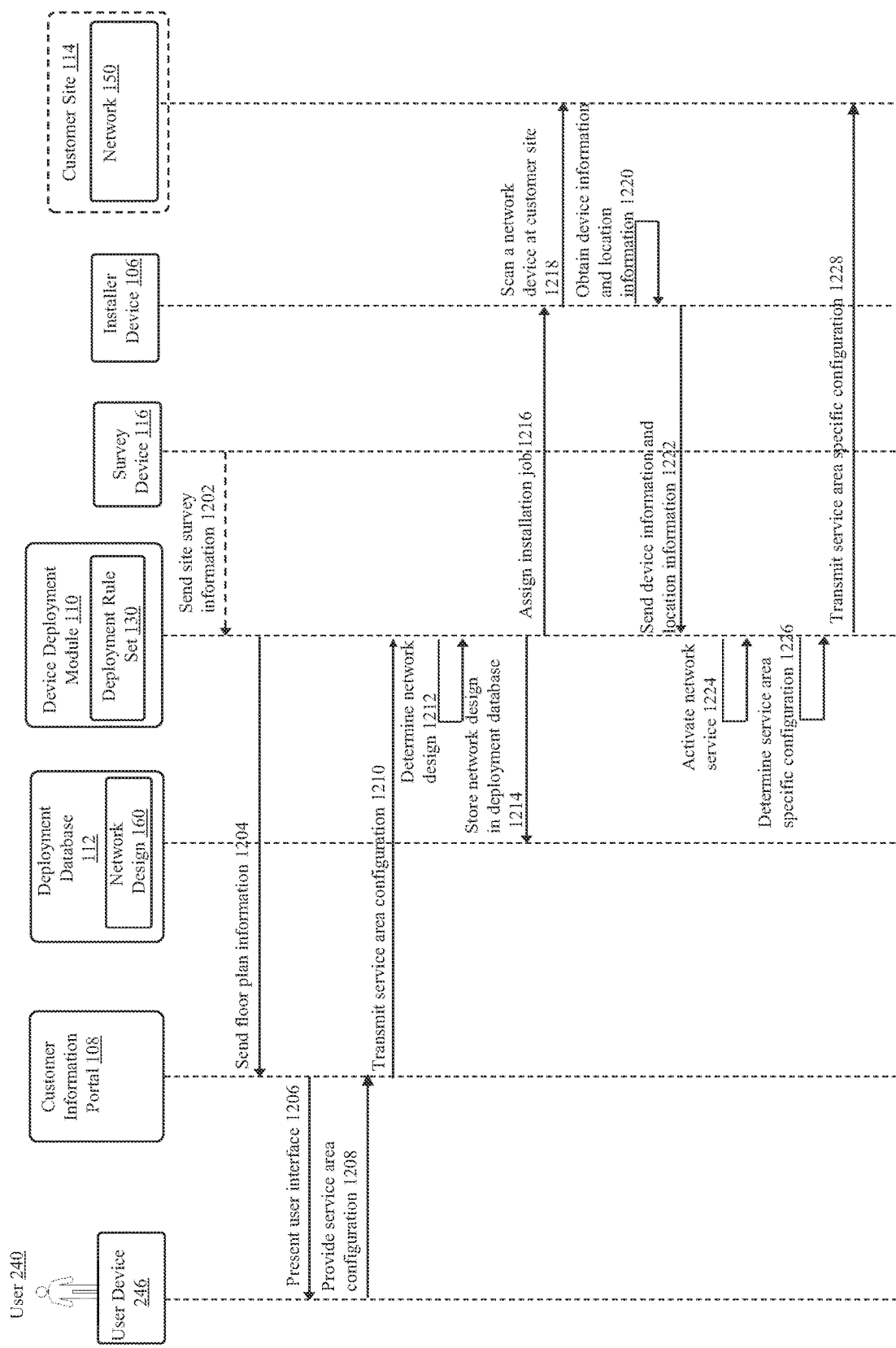
FIG. 12 shows a swim-lane diagram illustrating an example procedure of automatic network device configuration in the communications system depicted in FIG. 1.

FIG. 12 shows a swim-lane diagram illustrating an example procedure for automatic service area based network device configuration in the communications system 100 depicted in FIG. 1. In this automatic service area based network device configuration, a user interface is presented to a user or customer (e.g., a layperson such as a worker on-site or an end-user such as an employee of an enterprise) at the customer site 114 to obtain user input information regarding service area configuration in a floor plan of the customer site and service area specific configuration of a network device is automatically determined based on the service area configuration in the floor plan of the customer site and the location information of the network device. Although operations in the example procedure in FIG. 12 are described in a particular order, in some embodiments, the order of the operations in the example procedure may be altered so that certain operations may be performed in an inverse order or so that certain operations may be performed, at least in part, concurrently with other operations.

In operation 1202, which may be optional, the survey device 116 transmits survey information of the customer site 114 to the device deployment module 110 of the cloud server 102. The site survey information may include at least one floor plan of at least one building at the customer site, wired connectivity information for the customer site, such as the number of wired port(s), type of wired port(s) (e.g., power over ethernet (PoE) vs. non-PoE), and/or the location(s) of port(s) available at the customer site and/or to be newly installed at the customer site, and/or wireless connectivity information for the customer site, such as the number of wireless APs available at the customer site and/or to be newly installed at the customer site to deliver the coverage and capacity required for the customer site. In operation 1204, which may be optional, floor plan information is transmitted from the device deployment module to the customer information portal 108. In some embodiments, at least one floor plan of at least one building at the customer site is provided to the device deployment module and/or the customer information portal 108 by a user or customer at the customer site 114, for example, the user 240 through the user device 246 depicted in FIG. 2.

In operation 1206, the customer information portal 108 presents a user interface (e.g., a GUI) to the user 240. In operation 1208, the user 240 provides service area configuration through the user interface. For example, the customer information portal 108 presents a GUI on a screen (e.g., a touch screen) of the user device 246 of the user 240, which allows the user to graphically set (e.g., use a finger to select or slide on the GUI) service areas on a floor of a building in the customer site 114, e.g., using a software application or App installed on the user device (e.g., a mobile phone or tablet). For example, input information may be received on the user interface from the user, which creates a service areas on a floor in a floor plan of the customer site and network service configuration of the service areas is received on the user interface from the user. Once a user or customer defines a service area or zone on a floor plan using the interface, the boundaries of the service area or zone are defined. Any network device whose location falls in the boundaries of the service area or zone (e.g., the X, Y coordinates of the service area or zone) is deemed to be part of the service area or zone and the appropriate configuration is sent to the network device. In some embodiments, the service area configuration in a floor plan of the customer site includes a space division of a floor in the floor plan of the customer site into multiple service zones. Each of the service zones may be a contiguous geographical area on the floor. In some embodiments, the service area configuration in the floor plan of the customer site further includes network service configuration of the service zones, which may contain information specifying network services in the service zones. In some embodiments, multiple network services may be advertised in a single service zone.

In operation 1210, the service area configuration is transmitted from the customer information portal 108 to the device deployment module 110, which subsequently determines network information (e.g., the network design 160) for a network to be deployed at the customer site 114 (e.g., the network 150) in operation 1212. In some embodiments, the network design may also include a Bill of Materials (BoM) and a connectivity map for the network to be deployed at the customer site. Because the device deployment module can automatically determine a network design for a network at a customer site (e.g., the customer site 114), network design efficiency and accuracy can be improved. After the device deployment module 110 of the cloud server 102 determines the network design 160 for a network to be deployed at the customer site 114, in operation 1214, the device deployment module stores the network design 160 in the deployment database 112.

In some embodiments, after the device deployment module 110 of the cloud server 102 determines the network design 160 for a network to be deployed at the customer site 114, the network 150 is deployed (e.g., network devices including switches, routers, hubs, and/or wireless APs are installed) at the customer site 114 based on the network design. In operation 1216, the device deployment module 110 assigns an installation job to an installer or technician that uses the installer device 106. In some embodiments, the installer/technician uses a mobile application (app) that is installed in the installer device and is assigned the installation job via the mobile app. For example, the installer device is a handheld wireless device, such as a cellular phone or a mobile phone (e.g., a smart phone), a pad computer, a PDA etc., and the mobile app is a mobile application from an application store (e.g., Android Market, Apple App Store, Amazon Appstore, carrier applications stores, etc.). In an embodiment, an installation job that is assigned to the installer or technician includes detailed information related to a customer and network device deployment information. The detailed information related to a customer may include the name of the customer, site information of the customer, floor information of the customer, and/or the address of the customer. The network device deployment information may include a list of device(s) to be installed and device type(s), floor plan(s) and locations of a network device is to be installed in a floor plan, and/or a deployment topology that defines how network devices are connected to each other. One or more network devices to be installed are sent to a customer site. In some embodiments, there is no pre-population of device specific information (e.g., device serial number and/or media access control (MAC) address) of a network device to be installed in a central database when the network device to be installed is sent to a customer site. For example, the device deployment module 110 has no knowledge of specific information (e.g., device serial number and/or media access control (MAC) address) of a network device to be installed at a customer site before the network device is installed at the customer site.

In operation 1218, an installer or a technician uses the installer device 106 to scan the one or more network devices 104-1, . . . , 104-N of the network 150 at the customer site 114. In some embodiments, the installer or technician uses information in a mobile app installed in the installer device and scans each of the network devices 104-1, . . . , 104-N at a customer location indicated by the mobile app. The installer or technician may use the installer device (e.g., a mobile app installed in the installer device) to scan a code (e.g., a Quick Response (QR) code) of each of the network devices 104-1, . . . , 104-N. The code of a network device may be on a surface of the network device and/or on the packaging (e.g., the box or the wrapper) of the network device. For example, the code of a network device may be stamped on, printed on, or attached to a surface of the network device and/or on the packaging of the network device. The code of a network device may be any suitable code that can be read (e.g., optically read) by the installer device 106, which may be a handheld device, such as a mobile phone or a tablet. For example, the code of a network device may be a QR code or a two-dimensional (2D) barcode on the network device (e.g., printed on a housing of the device itself or printed on packaging of the network device). The code (e.g., the QR code) on a network device may represent or contain the serial number of the network device, a device type of the network device, and/or MAC address information of the network device. In another example, the code of a network device is a radio-frequency identification (RFID) tag or a Near-Field-Communication (NFC) tag that can be wirelessly read by the installer device 106. In operation 1220, the installer device 106 obtains information regarding the one or more network devices 104-1, . . . , 104-N of the network 150 (e.g., device information and location information of the one or more network devices 104-1, . . . , 104-N of the network 150) based on scanning of the network devices. For example, the installer device 106 obtains the serial number of each network device, a device type of each network device, and/or MAC address information of each network device based on a scanned QR code of each network device and the location of each network device during the scan of the QR code of each network device.

In operation 1222, the installer device 106 transmits the information regarding each of the network devices 104-1, . . . , 104-N that is obtained from a scan of the network device and/or location information of the network device to the device deployment module 110 of the cloud server 102. Examples of location information of a network device include without being limited to, address information in a map/navigation system, coordinate information in a map/navigation system, latitude and longitude information in a map/navigation system, and relative positional information in a map/navigation system. In some embodiments, the location information of a network device includes one or more GPS coordinates of the network device. In some embodiments, the installer device transmits the MAC address and the serial number of the network device and the customer information from a mobile app installed in the installer device that contains location information of the network device to the device deployment module.

In operation 1224, the device deployment module 110 of the cloud server 102 activates each of the network devices 104-1, . . . , 104-N of the network 150, for example, based on the device information and/or the location information received from the installer device, the network design 160, and/or the deployment rule set 130. In some embodiments, the device deployment module associates each network device with a database entry of the network design 160 in the deployment database 112 of the cloud server without manual input. After a network device is associated with a corresponding database entry in the deployment database, the network device is activated. In some embodiments, the device deployment module performs location based service activation of the network devices 104-1, ..., 104-N. In some embodiments, when a network device is activated, the X, Y coordinates of the network device are communicated to the device deployment module, which maps the X, Y coordinates to a service area or zone in a floor of a building at the customer site and builds or determines a zone specific configuration for the network device. For example, if the X, Y coordinates of a specific network device is within the boundary of a particular service area in a floor (e.g., within the corner X, Y coordinates of the particular service area in a floor), the specific network device is determined as being in the particular service area and the network configuration (e.g., one or more particular networks such as SSIDs) that is set for the particular service area is applied to or by the specific network device.

In operation 1226, the device deployment module 110 of the cloud server 102 automatically determines service area specific configuration for a network device (e.g., the network devices 104-1, ..., 104-N of the network 150), for example, based on the network design 160 and/or the deployment rule set 130. Operation 1226 may be executed prior to, concurrently with, or after operation 1224. The device deployment module may automatically determine service area specific configuration for a network device based on service area configuration in a floor plan of the customer site that is received from a user interface and the location information (e.g., the deployed location) of the network device. For example, the deployed location of the network device at the customer site may include coordinates of the network device on a floor in the floor plan of the customer site. In some embodiments, the coordinates of the network device on the floor in the floor plan of the customer site are mapped to one of the service zones on the floor. In some embodiments, the service area specific configuration of the network device is automatically determined based on the service area configuration in the floor plan of the customer site, the location information of the network device, and the network device information of the network device. In operation 1228, the service area specific configuration of the network device is transmitted to the network device in the network, which configures its device and network setting(s) according to the service area specific configuration. For example, if the X, Y coordinates of a specific network device is within the boundary of a particular service area in a floor (e.g., within the corner X, Y coordinates of the particular service area in a floor), the specific network device is determined as being in the particular service area and the network configuration (e.g., one or more particular networks such as SSIDs) that is set for the particular service area is applied to or by the specific network device.

Figure 13:
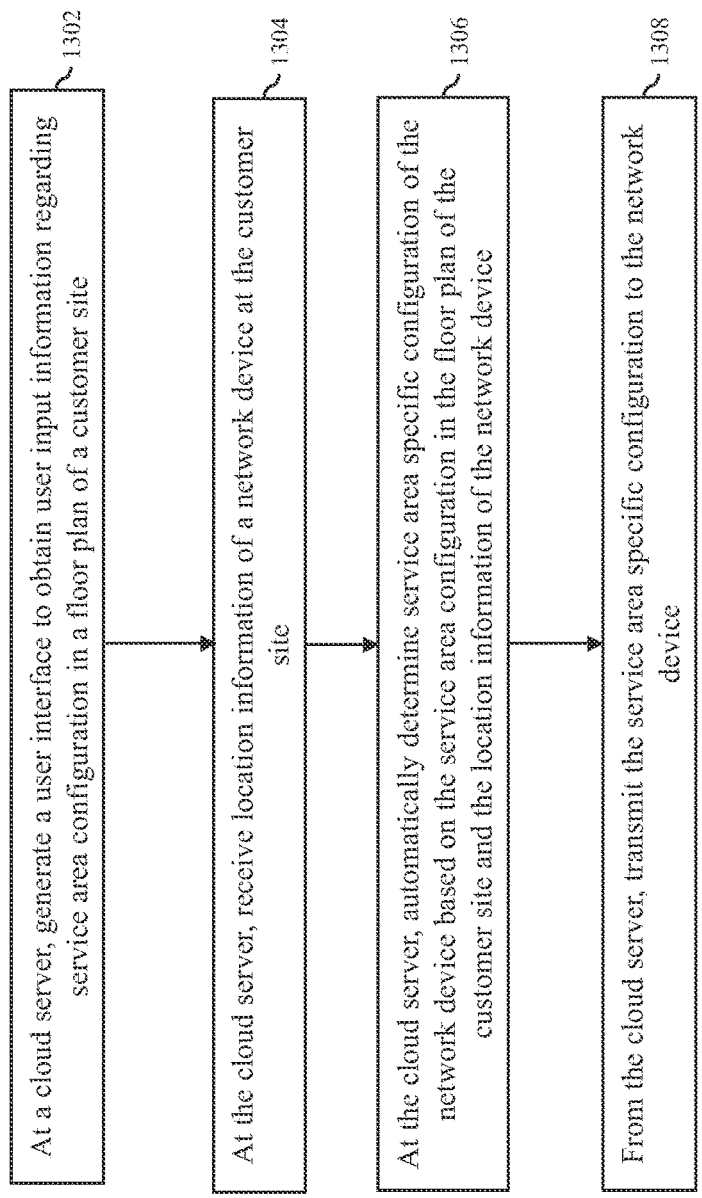
FIG. 13 is a process flow diagram of a method of network device configuration in accordance to an embodiment of the invention.

FIG. 13 is a process flow diagram of a method of network deployment in accordance to an embodiment of the invention. According to the method, at block 1302, at a cloud server, a user interface is generated to obtain user input information regarding service area configuration in a floor plan of a customer site. In some embodiments, the user interface includes a graphical user interface (GUI). In some embodiments, the service area configuration in the floor plan of the customer site includes a space division of a floor in the floor plan of the customer site into a plurality of service zones, and each of the service zones is a contiguous geographical area on the floor. In some embodiments, the service area configuration in the floor plan of the customer site further includes network service configuration of the service zones. In some embodiments, the network service configuration of the service zones includes information specifying network services in the service zones. In some embodiments, the network service configuration of the service zones includes information specifying network services to be advertised in a single service zone of the service zones. At block 1304, at the cloud server, location information of a network device is received at the customer site. In some embodiments, the location information of the network device includes a deployed location of the network device at the customer site. In some embodiments, the deployed location of the network device at the customer site includes coordinates of the network device on a floor in the floor plan of the customer site. At block 1306, at the cloud server, service area specific configuration of the network device is automatically determined based on the service area configuration in the floor plan of the customer site and the location information of the network device. In some embodiments, at the cloud server, the coordinates of the network device on the floor in the floor plan of the customer site are mapped to one of a plurality of service zones on the floor. At block 1308, from the cloud server, the service area specific configuration is transmitted to the network device. In some embodiments, at the cloud server, network device information of the network device is received, and at the cloud server, the service area specific configuration of the network device is generated based on the service area configuration in the floor plan of the customer site, the location information of the network device, and the network device information of the network device. The operations 1302, 1304, 1306, 1308 in the flow diagram of FIG. 13 may correspond to the operations 1206, 1208, 1222, 1224, 1226 in the swim-lane diagram of FIG. 12. The cloud server may be similar to, the same as, or a component of the cloud server 102 depicted in FIG. 1. The network device may be similar to, the same as, or a component of the network devices 104-1, ..., 104-N depicted in FIG. 1. The customer site may be similar to, the same as, or a component of the customer site 114 depicted in FIG. 1.

Figure 14:
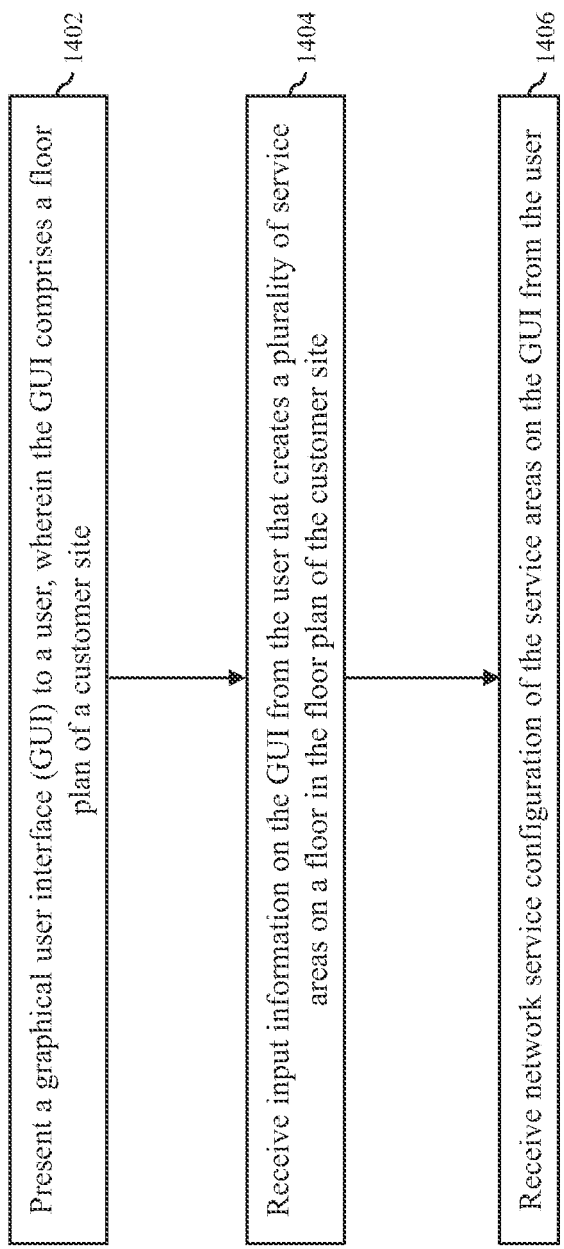
FIG. 14 is a process flow diagram of a method of network device configuration in accordance to an embodiment of the invention.

FIG. 14 is a process flow diagram of a method of network deployment in accordance to an embodiment of the invention. According to the method, at block 1402, a graphical user interface (GUI) is presented to a user, where the GUI includes a floor plan of a customer site. At block 1404, input information is received on the GUI from the user that creates a plurality of service areas on a floor in the floor plan of the customer site. At block 1406, network service configuration of the service areas is received on the GUI from the user. The operations 1402, 1404, 1406 in the flow diagram of FIG. 14 may correspond to the operations 1206, 1208 in the swim-lane diagram of FIG. 12. The GUI may be similar to, the same as, or a component of the GUI depicted in FIGS. 6-11. The user may be similar to, the same as, or a component of the user 240 depicted in FIG. 2. The customer site may be similar to, the same as, or a component of the customer site 114 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of network device configuration, the method comprising:
   at a cloud server, generating a user interface to obtain user input information regarding service area configuration in a floor plan of a customer site, wherein the user input information specifies that each service area in the floor plan of the customer site has a unique corresponding wireless service set identifier (SSID);
   at the cloud server, receiving location information of a network device at the customer site;
   at the cloud server, automatically determining service area specific configuration of the network device based on the service area configuration in the floor plan of the customer site and the location information of the network device; and
   from the cloud server, transmitting the service area specific configuration to the network device.

2. The method of claim 1, wherein the user interface comprises a graphical user interface (GUI).

3. The method of claim 2, wherein the service area configuration in the floor plan of the customer site comprises a space division of a floor in the floor plan of the customer site into a plurality of service zones, and wherein each of the service zones is a contiguous geographical area on the floor.

4. The method of claim 3, wherein the service area configuration in the floor plan of the customer site further comprises network service configuration of the service zones.

5. The method of claim 4, wherein the network service configuration of the service zones comprises information specifying a plurality of network services in the service zones.

6. The method of claim 4, wherein the network service configuration of the service zones comprises information specifying a plurality of network services to be advertised in a single service zone of the service zones.

7. The method of claim 1, wherein the location information of the network device comprises a deployed location of the network device at the customer site.

8. The method of claim 7, wherein the deployed location of the network device at the customer site comprises a plurality of coordinates of the network device on a floor in the floor plan of the customer site.

9. The method of claim 8, wherein at the cloud server, automatically determining the service area specific configuration of the network device based on the service area configuration in the floor plan of the customer site and the location information of the network device comprises at the cloud server, mapping the coordinates of the network device on the floor in the floor plan of the customer site to one of a plurality of service zones on the floor.

10. The method of claim 1, further comprises at the cloud server, receiving network device information of the network device, wherein at the cloud server, automatically determining the service area specific configuration of the network device based on the service area configuration in the floor plan of the customer site and the location information of the network device comprises at the cloud server, automatically determining the service area specific configuration of the network device based on the service area configuration in the floor plan of the customer site, the location information of the network device, and the network device information of the network device.

11. A cloud server, the cloud server comprising:
   a processor for executing executable instructions stored in memory, the executable instructions comprising:
      a customer information portal configured to generate a user interface to obtain user input information regarding service area configuration in a floor plan of a customer site, wherein the user input information specifies that each service area in the floor plan of the customer site has a unique corresponding wireless service set identifier (SSID); and
      a device deployment module connected to the customer information portal, wherein the device deployment module is configured to:
         receive location information of a network device at the customer site;
         automatically determine service area specific configuration of the network device based on the service area configuration in the floor plan of the customer site and the location information of the network device; and
         transmit the service area specific configuration to the network device.

12. The cloud server of claim 11, wherein the user interface comprises a graphical user interface (GUI).

13. The cloud server of claim 12, wherein the service area configuration in the floor plan of the customer site comprises a space division of a floor in the floor plan of the customer site into a plurality of service zones, and wherein each of the service zones is a contiguous geographical area on the floor.

14. The cloud server of claim 13, wherein the service area configuration in the floor plan of the customer site further comprises network service configuration of the service zones.

15. The cloud server of claim 14, wherein the network service configuration of the service zones comprises information specifying a plurality of network services in the service zones.

16. The cloud server of claim 11, wherein the location information of the network device comprises a deployed location of the network device at the customer site.

17. The cloud server of claim 16, wherein the deployed location of the network device at the customer site comprises a plurality of coordinates of the network device on a floor in the floor plan of the customer site.

18. The cloud server of claim 17, wherein the device deployment module is further configured to map the coordinates of the network device on the floor in the floor plan of the customer site to one of a plurality of service zones on the floor.

19. The cloud server of claim 11, wherein the device deployment module is further configured to:
  receive network device information of the network device; and
  automatically determine the service area specific configuration of the network device based on the service area configuration in the floor plan of the customer site, the location information of the network device, and the network device information of the network device.

20. A method of network device configuration, the method comprising:
  presenting a graphical user interface (GUI) to a user, wherein the GUI comprises a floor plan of a customer site;
  receiving input information on the GUI from the user that creates a plurality of service areas on a floor in the floor plan of the customer site, wherein the input information specifies that each service area on the floor in the floor plan of the customer site has a unique corresponding wireless service set identifier (SSID); and
  receiving network service configuration of the service areas on the GUI from the user.

* * * * *